June 6, 1950 — O. L. SHOOK — 2,510,424
CHASSIS FOR PORTABLE MACHINES
Original Filed Oct. 27, 1944

Inventor
Owen L. Shook

By Clarence A. O'Brien and Harvey B. Jacobson
Attorneys

Patented June 6, 1950

2,510,424

UNITED STATES PATENT OFFICE 2,510,424

CHASSIS FOR PORTABLE MACHINES

Owen L. Shook, Keysville, Va.

Original application October 27, 1944, Serial No. 560,601, now Patent No. 2,430,689, dated November 11, 1947. Divided and this application August 18, 1947, Serial No. 769,135

1 Claim. (Cl. 280—111)

This invention relates to a novel chassis for portable machines, such as lumber handling machines of the type disclosed in my co-pending application for U. S. Letters Patent, Serial No. 560,601, filed October 27, 1944, now Patent No. 2,430,689, Nov. 11, 1947, of which the present application constitutes a division.

The primary object of the present invention is to provide a novel and simple chassis construction of the above kind which permits the chassis frame and any apparatus mounted thereon to maintain a level position even though a rear supporting wheel at one side of the machine rests upon the ground at a higher elevation than the rear supporting wheel at the opposite side of the machine.

Another object of the invention is to provide a chassis of the above kind including a front towing and steering means composed of a drawbar and steering and supporting wheels steered thereby, so that the machine of which the chassis forms a part may be readily towed from point to point.

The exact nature of the present invention will become apparent from the following description when considered in connection with the accompanying drawings, in which.

Figure 1:
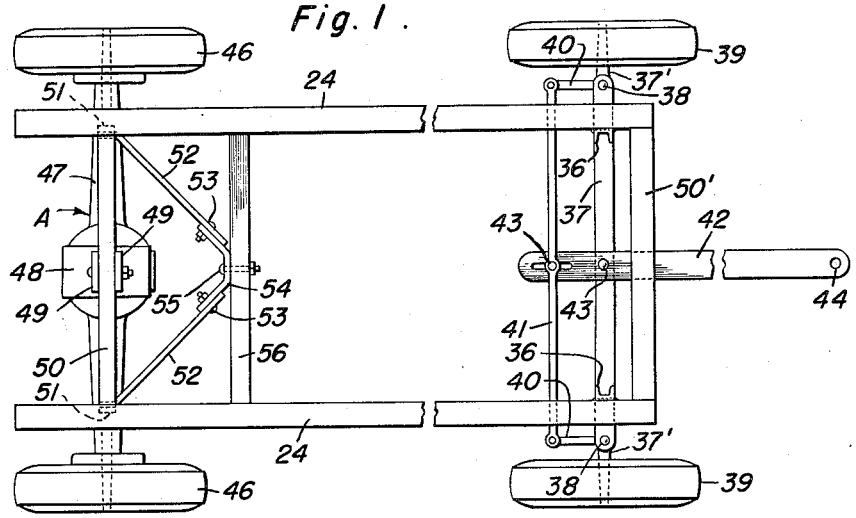
Figure 1 is a top plan view, partly broken away, of a chassis constructed in accordance with the present invention.
Figure 2:
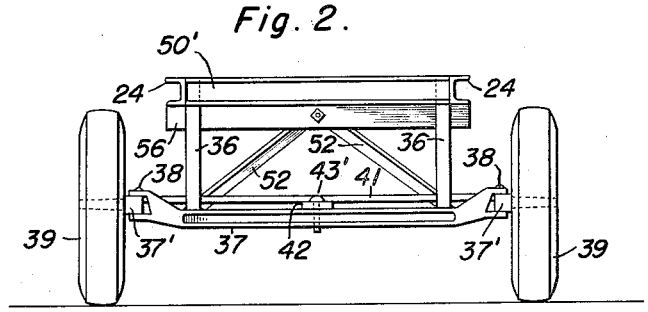
Figure 2 is a front elevational view thereof.

Referring in detail to the drawing, the present chassis includes a frame composed of side channel rails 24 rigidly connected by cross members 50, 50′ and 56. The front end of the chassis frame is supported by standards 36 upon a front axle 37 having horizontally swinging stub axles 37′ which are hinged at 38 and carry front steering and supporting wheels 39. Rearwardly projecting steering arms 40 of the stub axles are operatively connected by a tie rod 41, as is conventional in motor vehicle construction. Pivoted intermediate its ends upon the central portion of axle 37 is a drawbar 42 that projects rearwardly of the axle 37 and has a pivotal and slidable connection 43 with the tie rod 41. The pivot between drawbar 42 and axle 37 is indicated at 43′, and the forward end of drawbar 42 is apertured at 44 to facilitate hitching of the same to a tractor. The arrangement is such that when the tractor makes a turn, drawbar 42 is actuated to correspondingly turn the wheels 39 about the stub axle pivots 38 so that the chassis will be steered in a proper way to follow the direction of travel of the tractor by means of which the chassis is being towed.

Figure 3:
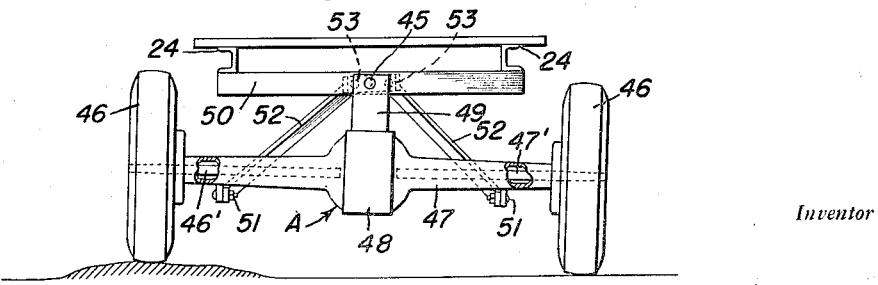
Figure 3 is a rear elevational view of the same, partly broken away and in section.

A rear axle assembly A is pivoted at 45 to the rear end of the chassis frame for tilting laterally relative to the latter. As shown, the rear axle assembly includes rear supporting wheels 46 carried on the ends of separate axles 46′ and 47′ journalled in a housing 47 whose enlarged central portion 48 has spaced plates 49 rigid with and projecting upwardly therefrom. The plates 49 receive between them the cross member 50, and the pivot 45 extends through the plates 49 and the cross bar 50. Hinged at 51 to the housing 47 at the inner sides of the wheels 46 are the rear ends of radius bars 52 which extend forwardly in converging relation and are hinged at their forward ends at 53 to the rearwardly diverging ends of a substantially U-shaped member 54 pivoted for turning movement about a longitudinal horizontal axis at 55 to the cross member 56. The purpose of this construction is to enable the chassis frame and any apparatus mounted thereon to maintain a horizontal position even though a supporting wheel 46 at either side of the machine rests upon the ground at a higher elevation than the wheel 46 at the opposite side of the machine. It is only necessary to level the front wheels 39, and levelling of the machine at the rear is unnecessary even though the ground may be uneven where the machine is placed in use as shown in Figure 3.

From the foregoing description, it is believed that the construction, operation and advantages of the present invention will be readily understood and appreciated by those skilled in the art. Minor changes and modifications may be made, such as fall within the scope of the invention as claimed.

Having described the invention what is claimed as new is:

In a chassis for portable machines, a chassis frame including side rails and rear and intermediate transverse members rigidly connecting said side rails, a rear axle assembly supporting the rear end of said chassis frame and including a housing having independent axles journalled therein and coaxial supporting wheels secured on the outer ends of said axles, a plate rigid with and projecting upwardly from the intermediate portion of the housing of said rear axle assembly and pivoted at its upper end to the rear transverse member of the chassis frame for permitting lateral tilting of said assembly relative to said frame, a substantially U-shaped laterally tiltable member pivoted intermediate its ends to the intermediate transverse member of the chassis frame intermediate the sides of the latter, and forwardly converging radius bars pivoted upon horizontal axes to and connecting the ends of the rear axle assembly to the ends of said laterally tiltable member.

OWEN L. SHOOK.

REFERENCES CITED

The following references are of record in the file of this patent:

UNITED STATES PATENTS

| Number | Name | Date |
|---|---|---|
| 1,132,398 | Sharp | Mar. 16, 1915 |
| 1,223,152 | Cove | Apr. 17, 1917 |
| 1,468,669 | Opitz | Sept. 25, 1923 |
| 2,047,206 | Knapp | July 14, 1936 |
| 2,074,289 | Wagner | Mar. 16, 1937 |
| 2,202,810 | Blane | June 4, 1940 |
| 2,284,892 | Persinske | June 2, 1942 |